United States Patent [19]

Kopelman

[11] Patent Number: 4,903,162

[45] Date of Patent: Feb. 20, 1990

[54] FIRE-PREVENTION ELECTRICAL WIRING DEVICE

[76] Inventor: Robert L. Kopelman, 121 Fountain Ave., Rockville Centre, N.Y. 11570

[21] Appl. No.: 223,411

[22] Filed: Jul. 25, 1988

[51] Int. Cl.[4] .................. H02H 5/04

[52] U.S. Cl. .................. 361/103; 307/117

[58] Field of Search .................. 361/103, 105, 106, 93; 307/116, 117; 340/584, 593, 594; 219/494, 510

[56] References Cited

U.S. PATENT DOCUMENTS

| | | | |
|---|---|---|---|
| 1,729,109 | 9/1929 | Haskins | 361/429 |
| 1,762,969 | 6/1930 | Farrington | 455/289 |
| 3,036,263 | 5/1962 | Hallas | 323/354 |
| 3,668,597 | 6/1972 | Nomura | 338/220 |
| 3,842,328 | 10/1974 | Supel et al. | 318/249 |
| 3,911,325 | 10/1975 | Plasko | 361/103 |
| 3,987,342 | 10/1976 | Bird et al. | 361/106 |
| 3,997,820 | 12/1976 | Hatefani | 361/380 |
| 4,131,868 | 12/1978 | Dombrowski et al. | 361/105 X |

FOREIGN PATENT DOCUMENTS

| | | | |
|---|---|---|---|
| 250960 | 11/1986 | Japan | 361/103 |

*Primary Examiner*—Derek S. Jennings
*Attorney, Agent, or Firm*—William T. Hough

[57] ABSTRACT

In a preferred embodiment, a receptacle having multiple electrical outlets includes in the main electrical inlet in electrical series with each of the electrical outlets, a heat-sensitive circuit-breaking element characterized as breaking of electrical circuit passed therethrough when the flow of current exceeds a predetermined amperage, as responsive to increased heat of resistance or other surrounding environmental heat, and as reestablishing circuitry when temperature has cooled-down to at-least a circuit-breaking temperature, there being preferably included in circuit with the circuit-breaking element a conventional electrical time delay element characterized by delaying reestablishing circuitry therethrough whenever circuitry has been broken, with a time delay of sufficient length to permit a cooling of circuitry to a point below circuit-breaking temperature of the circuit-breaking element, to prevent fire hazard from overheated old and/or inadequate house-wiring or insulation thereof.

9 Claims, 2 Drawing Sheets

FIG. 6
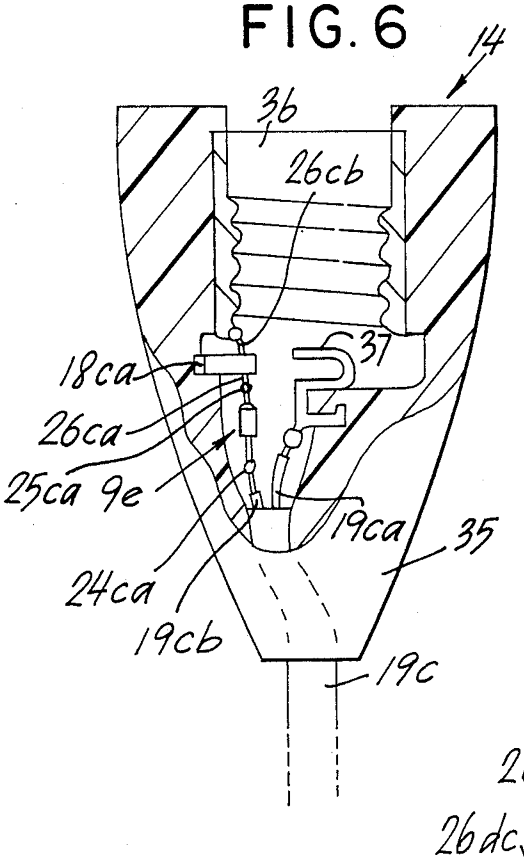
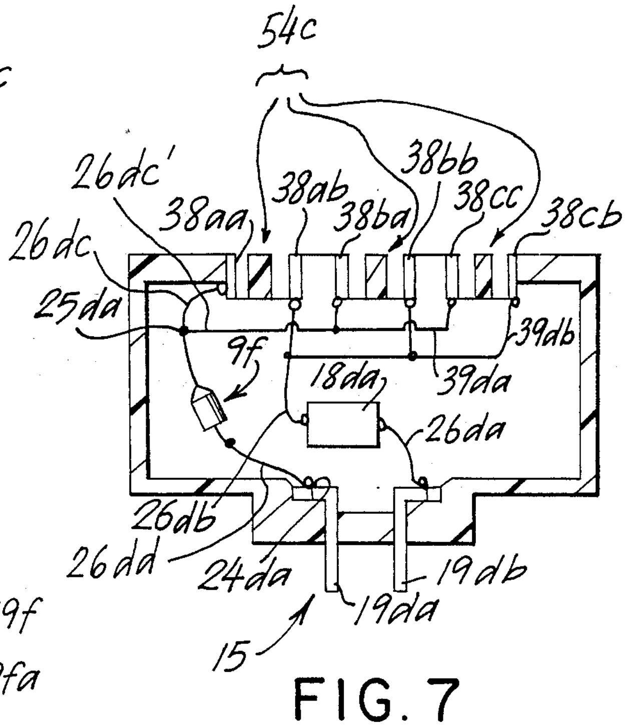
FIG. 7
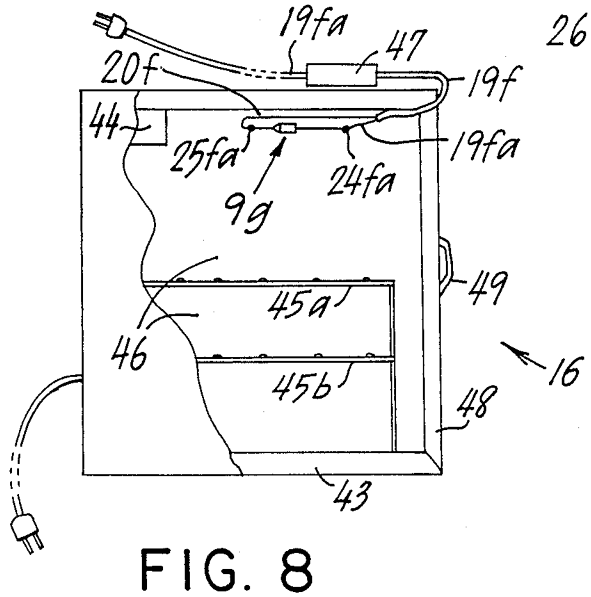
FIG. 8

FIRE-PREVENTION ELECTRICAL WIRING DEVICE

This invention is directed to a fire-prevention device to prevent fires from being initiated by overloads typically caused by multiple usage through multiple outlets or by inadequate or old house or building wiring.

PRIOR ART

It should be first noted that conventional circuit-breakers are located at or near the main electrical inlet-wiring of a house or building, and that such circuit breakers or alternatively fuse boxes do not overcome the problems that in reality occur. Apart from such fuse boxes and/or circuit breakers, the most related prior art arises from heat-sensitive and heat-responsive electrical circuitry switches known as micromatic switches, which when mounted in electrical series, break circuit when temperature of elements thereof or immediately-surrounding environmental elements or gases reach a pre-established temperature, and therafter circuit remains broken until the elements thereof cool-down.

Prior art patents located, appear to have little if any relevance to the present invention. Farrington U.S. Pat. No. 1,762,969 relates to a high frequency attenuating network utilizable in taking measurements with regard to frequency of oscillations. Hallas U.S. Pat. No. 3,036,263 relates to a switching system by which with a small number of switches and switching operations an impedance is progressively variable in steps of equal value. Hastefani U.S. Pat. No. 3,997,820 relates to a light dimmer utilizing a printed circuit board with electrical leads therefrom, together with improved heat-sink characteristics. Normura U.S. Pat. No. 3,668,597 relates to a slide rheostat and push-pull switch assembly such that electrical resistance is variable in association with an off-on switch operable at any regulated resistance level. Supel et al. U.S. Pat. No. 3,842,328 likewise relates to a combination of a rheostat—mechanism for variable resistance, in conjunction with a separate mechanism for varying positions of on-off switch contacts and full-speed contacts. Haskins U.S. Pat. No. 1,729,109 relates to a battery charging bench inclusive of a switching assembly making possible the ammeter-reading of the actual instant charging rate of any battery on charge and under actual charging conditions, including a knife switch and connected projecting member cummulative having a definite predetermined resistance.

BACKGROUND TO THE INVENTION

Prior to the present invention, over a period of years, electrical utensiles in the kitchen, other home rooms, and/or in office(s) have increased in great proportions, while the wiring of the house or building as originally installed was designed and installed on the basis of a maximum amperage and load far below that to which it is currently exposed. The utilization of multiple-outlets electrical plugs has further added to the problem. Moreover, in many old buildings, the old electrical wiring thereof is not only inadequate for reasons above-stated, but additionally the covering and/or other insulation around the wiring is in a deteriorated and hazardous condition, such that the carrying of any overload immediately results in a serious fire hazard from overheating thereof.

Another common source of fires arises from short-circuits or the like within electrical utensiles or accessories themselves which result in a fire prior to the buring-out of any house-fuse or prior to the activation of any house circuit-breaker, based on the way these fuses and/or circuit breakers normally function, recognizing that the current-carrying capacity of a single wire of an accessory is normally far below that of the main wiring leaving the fuse of circuit-breaker box.

OBJECTS OF THE INVENTION

Accordingly, objects of the present invention include the avoiding of fire hazards of the type and/or origin above-noted.

Another object is to obtain an electrical outlet accessory preventing loads above a safe level as characterized by a predetermined level of typical or average house-wiring circuitry.

Another object is to obtain utensile and/or accessory wiring for the main-power circuitry thereof, having built-in safeguards against electrical overloads such as could occur from a short circuit or the like.

Another object is to incorporate overload safeguards directly into electrical accessories, for the main power thereof.

Another object is to obtain an electrical plug incorporating overload safeguards directly therein.

Another object is to obtain preceding objects devoid of requiring replacement fuses or manual resetting or the like, following a potential overload.

Other objects become apparent from the preceding and following disclosure.

SUMMARY OF THE INVENTION

Broadly the invention may be described as an electrical power-source in combination with a main inlet circuitry of a utensile of which main inlet circuitry there is included a circuit-breaking and circuit making switching mechanism responsive to intermittent predetermined overload(s) of a magnitude above-which could constitute a fire hazard as a result of overheating of the main inlet or other inlet circuitry associated therewith or of insulation associated therewith or of surrounding objects or elements. The terminology "electrical power-source" as used herein, is intended to mean any wire or electrical outlet or main circuitry connected in series therewith for the conveying of main electric power therefrom to a point of connecting thereto one or more supplemental circuitries having reduced current-carrying capacity. The term, however, is also meant to include such power circuitry where in electrical series therewith further electrically up-line (in a direction toward the main source of power), fire hazards could exist from inadequate wiring capacity and/or insulation of such wiring, for the main power-source of the "electrical power source".

In a preferred embodiment, the circuit-breaking and circuit-making switching mechanism is heat-responsive such that heat generated therein beyond a predetermined or preset maximum, result in an intermittent breaking of circuitry until the generated temperature has dissipated to a point of or below the predetermined or preset maximum.

In another preferred embodiment, there is additionally included in electrical series, a time delay switch of any conventional or desired type, set to delay reestablishing of electrical closed-circuitry for a predetermined period after circuitry has been broken by the circuit-breaking and circuit-making mechanism.

In another preferred embodiment, the main electrical power source included as a part thereof or associated in series therewith, electrical plug elements—male and/or female members, for connecting with another source of main power, such as a house baseboard outlet, for example or as a part of or at an end of an extension cord, having electrically connected in series therewith and electrically downstream therefrom, a plurality of sub-circuitry-leads for separate electrical-power utilizing mechanisms.

Another preferred embodiment includes an electrical utensile and its main electrical utensile circuitry, with the circuit breaking and circuit making mechanism being mounted in electrical series within or in electrical series before or immediately after the main-current-carrying portion(s) of the electrical utensile circuitry. Thereby, multiple branching sub-circuitries of the utensile are located electrically down-stream the overload-detector and circuit-breaking mechanism.

In another preferred embodiment, the electrical utensile circuitry includes an electric receptacle article with main-power-receiving inlet circuitry thereof connected in series with a downstream electrical outlet and electrical contact(s) thereof. The electrical utensile circuitry, as previously noted, is electrically downstream relative to the electrical overload-detecting and circuit-breaking elements or mechanism which is adjacent or closer to the main power source in an electrical downstream direction. More preferably, the electrical outlet is a light-bulb receptacle adapted to have a light bulb functionally mounted therein.

In a further preferred embodiment, the main electrical utensile circuitry comprises an electric plug structure having electrical inlet male prong-contacts, and the main electrical utensile circuitry providing multiple electrical female outlets, with the electrical load-detector and circuit-breaking mechanism mounted in electrical series between the electrical plug structure and the multiple female outlets.

In a further preferred embodiment, the main electrical utensile circuitry includes a rheostat mechanism, such as a light-dimmer, positioned electrically downstream of and in electricl series with the electrical load-detector and circuit-breaking switch mechanism.

In a further preferred embodiment, there is included an alarm and alarm-activating mechanism responsive to a load-detector and circuit-breaking mechaninism of the circuit-breaking and circuit breaking switch, adapted to close an alarm-circuit and thereby activate said alarm whenever electrical overload reaches or passes a predetermined amount.

As previously stated, while the heat-sensitive and heat-activatable circuit-breaking and circuit-making switch previously described, is preferred for various embodiments because of the measure of heat being the final entity in causing a fire to break-out, and therefore more reliable as a measure of degree of actual hazard at any particular point in time, nevertheless in broader embodiments of the invention, any conventional or desirable circuit-breaker may be utilized as a part of the overall inventive combination above-described.

THE FIGURES

FIG. 1 illustrates existing prior art technology, illustrating in side view a recently-developed micromatic switch, shown in side view, which includes operative elements in a combination by which a normally-closed switch conducts electrical current between the inlet and outlet leads thereof, but which includes heat-sensitive component(s) which causes electrical circuitry to be broken when the temperature of the associated component(s) and/or surrounding environment reach(es) a temperature of or beyond a predetermined maximum for that particular micromatic switch, but which reestablishes closed-circuitry whenever the above-described associated temperature drops to or below the predetermined maximum, as the case may be. This illustrated switch has been commercially available since before the present invention, and is still commercially available in the United States.

FIG. 6 illustrates diagrammatically a typical female outlet in the nature of a light-bulb receptacle having a female-threaded electrical contact and a button central other electrical contact, illustrated in side view, with partial cut-away for improved illustration of the invention embodied therein.

FIG. 7 illustrates diagrammatically, an electrical outlet plug having a plurality of electrical female plug-outlet contacts and a pair of male-pronged electrical inlet-contacts, illustrated in side view with partial cut-away for improved illustration of the invention embodied therein.

FIG. 8 diagrammatically illustrates a freezer embodiment in which the heat-sensitive switch in which breaking of circuit is indicative of mal-function of the freezer, shown in side view with partial cutaway for improved understanding and illustration.

DETAILED DESCRIPTION OF THE INVENTION

In the foregoing Figures, common or related indicia have been used for corresponding elements or components of the different illustrated embodiments, in order to facilitate improved understanding of the following description.

Each of the embodiments of the foregoing Figures, while to different embodiments, include common elements of the basic combination, as previously broadly described. In the following descriptions of those embodiments, once an element has been identified or described, it is not thereafter repeated for the corresponding element or part for different embodiments, except as necessary to improve understanding.

Figure 1:
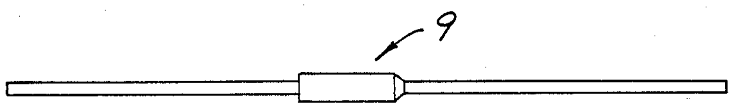
FIG. 1 (PRIOR ART)
Figure 2:
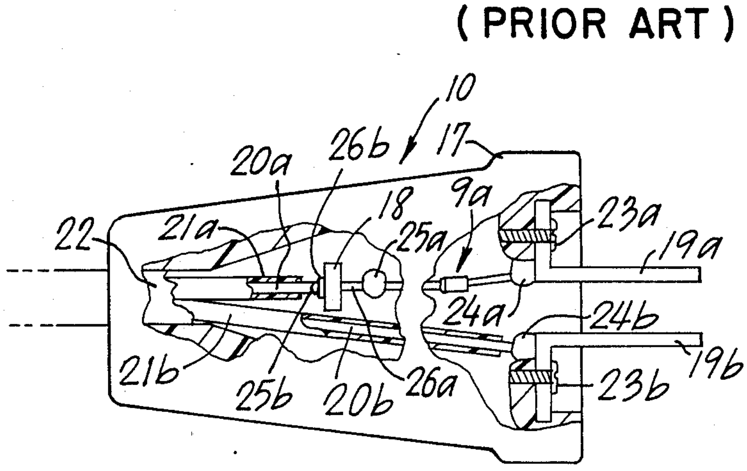
FIG. 2 illustrates diagrammatically one preferred embodiment of the present invention, as an electrical male-pronged plug, shown in side-view with partial cut-away for improved illustration of the invention as embodied therein.

Accordingly, FIG. 2 illustrates electrical male plug 10 having insulation-body 17 typically of rubber or plastic, and a conventional commercially available time-delay switch 18 (merely diagrammatically represented as) operatively connected at solder-fusion junction 25*a* in electrical series with the temperature responsive circuit-breaking and circuit-making switch 9*a* (the indicia designation including the electrical input and outlet leads thereof as shown and identical to the prior-art representation of FIG. 1). In this embodiment, both the time-delay switch 18 and the temperature-responsive switch 9*a* are in electrical series with leads to and from the electrical male prong 19*a* and eventually to the wire-lead 20*a* with its insulation 21*a*. The heat-sensitive switch 9*a* is connected to the male prong 19*a* by solder-junction 24*a*. The wire-lead 20*a* is solder-connected at junction 25*b* to the terminal 26*b* of time-delay switch 18. Prong 19*a* is mounted onto plug body 17 by male screw 23. Lead-wire 20*a* and its insulation 21*a* and lead-wire 20*b* and its insulation 21*b* are unified (held-together by insulation), collectively identified as cord 22. The lead-wire 20*b* is connected by solder-junction 24*b* to the other male-prong 19 that is mounted by screw 23*b* onto the plug body 17.

Figure 3:
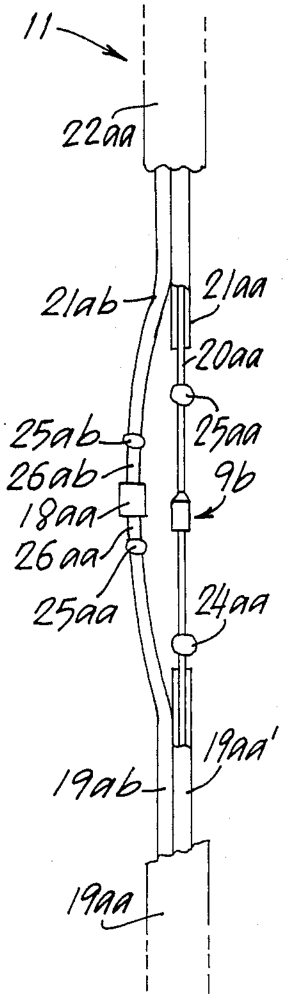
FIG. 3 illustrates diagrammatically another preferred embodiment, inclusive of an electrical wire-combination, illustrated in side view, with partial cut-away of outer insulation, for improved illustration of the invention as embodied therein.

FIG. 3 illustrates a novel electrical cord 11, having proximal end 22*aa* and distal end 19*aa* thereof, shown diagrammatically with cut-away surrounding insulations of the cord and of the respective wires merely for purposes of improved illustration. In this embodiment, the heat-sensitive switch 9*b* is mounted between solder-junction 25*aa* to wire 20*aa* (with its solder-insulation 21*aa*) and solder-junction 25*aa* to the wire broadly designated 19*aa'* (inclusive of its insulation), while the time-delay switch 18*aa* with its opposite leads 26*ab* and 26*aa*, is mounted between the wire lead of wire 21*ab* (broadly referred to) and 19*ab* (broadly referred to) by respective solder-junctions 25*ab* and 25*aa*. In this embodiment, by use of such a cord-combination, any electrical utensile connected thereby to any plug, is protected against overloading the wire as a result of too many utensiles or short-circuiting, or the like, by virtue of the electrical circuit-breaking and circuit-making switch 9*b* and the time-delay switch 18*aa* apart of the composite cord 11.

Figure 4:
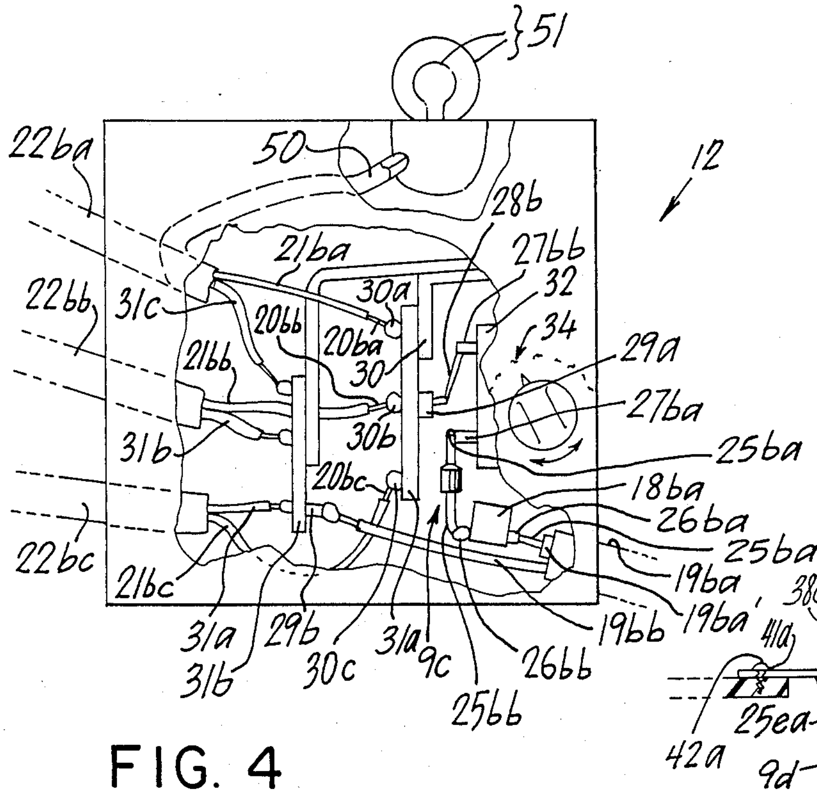
FIG. 4 illustrates diagrammatically a light-dimmer combination embodying the present invention, shown is side view with partial cut-away for improved illustration of the invention embodied therein.

FIG. 4 illustrates a light-dimmer combination 12 having the heat-sensitive switch 9*c* mounted in electrical series with the time-delay switch 18*ba* relative to the same wire 26*ba* (and its insulation 19*ba'*) of electrical power-cord 19*ba*, being substantially the same arrangement as in the FIG. 2 embodiment, exept for reverse-order of series arrangement. the electrical outlet lead of switch 9*c* is connected by solder-junction 25*ba* to the electrical input contact 27*ba* of reostatic switch 32 having (collectively) indicator knob and dial-marks 34. Rheostatically adjusted electrical current exits by contact 27*bb* by electrical lead 28*b* to a distribution elements base contact 29*a* mounted on electrically-conductive plate 31*a* having outlet soldered electrical-contact junctions 30*a*, 30*b* and 30*c* to electrical outlet lead 20*ba*, 20*bb* and 20*bc* respectively of cords 22*ba*, 22*bb* and 22*bc* respectively. The other wires 31. Plate 31 is mounted on casing-support structure 30. The other wires (broadly identified) 31*a*, 31*ba* and 31*c* are connected to electrically conductive plate 31*b* having base contact 29*b* from which wire (boradly) 19*bb* connects base contact 29*b* the electric power-cord (broadly) 19*ba*.

Figure 5:
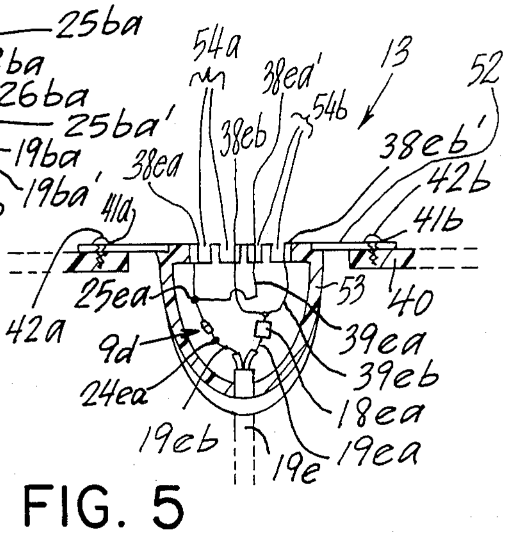
FIG. 5 illustrates diagrammatically a typical wall-receptacle embodiment of the present invention, as typically mounted in a wall-baseboard, with partial cut-away for improved illustration of the invention embodied therein.

FIG. 5 diagrammatically shows a wall's baseboard 40 having a base-board electric outlet-receptacle 13 that includes the mounting plate 52 thereof on which the receptacle body 53 is mounted on the baseboard 40. Mounting plates 52 are mounted on the The receptacle body 53 typicaly of plastic (as shown) may be of metal, fiberglass or the like, and has two pairs of female openings 54*a* and 54*b* with their respective electrical contacts (diagrammatically shown) 38*ea* and 38*ea'*, *and contacts* 38*eb* and 38*eb'*, *with respective lead wires* 39*ea* and 39*eb*, typical solder junctions 25*ea* and 243*a* mounting the heat-sensitive circuit-breaking and circuit-making switch 9*d* connected to lead wire 19*eb*. The timer (i.e. delay) switch 18*ea* is represented operatively mounted in electrical series between electric lead wire 19*ea* and the lead wires 39*eaa*. Electricity-inlet power cord (broadly) 19*e* includes the wires 19*ea* and 19*eb* with their respective insulations.

The FIG. 6 electric light-bulb receptacle 14 has the female-threaded contact 36*a* and the male contact 37. The heat-sensitive switch 9*e* is mounted in electrical series with the timer or delay switch 18*ca* with the respective leads 26*cb* and 26*ca* and typical and respective solder-junctions 25*ca* and 24*ca*, and the like, all within typically plastic body 35.

FIG. 7 illustrates a conventional type plug adapter 15 embodying the inventive combination, having male plug prongs 19*db* and 19*da*, and the multiple pairs of female outlets with their respective electrical contacts 38*aa*, 38*ba*, 38*ca* and contacts 38*ca*, 38*cb* and 38*cc* all merely symbollically shown. In this particular illustrated embodiment, the heat-sensitive switch 9*f* is connected in electrical series between leads 26*dc*, 26*dc'* and lead 26*dd*, while the timer or delay switch 18*da* is connected in electrical series in the other line of wires 26*da* and 26*db*.

FIG. 8 illustrates a tyical refrigerator or freezer embodiment 16 with door 48 and handle 49 thereof, for enclosure-body 43, enclosing freezer unit 44 within space 46 in which shelves 45*a* and 45*b* are mounted. The freezer-space enclosed heat-sensitive switch 9*g* is connected by electric cord 19*f* in electrical series with electric lead 19*fa* and 20*f* by typical solder junctions 25*fa* and 24*fa*, connected by electric cord 19*f* to alarm 19*fa* operatively in a conventional manner such that alarm 47 becomes activated when the heat within enclosure space 46 rises to or beyond a predetermined unacceptable temperature, and shuts-off whenever the temperature again drops to or below the predetermined point. Concurrently, any electrical or other malfunction causing heat to rise would result likewise in setting-off the alarm. Power to the alarm 47 and the cord 19*f* are provided by electricity-source power cord 19*fa*.

It is within the scope of this invention to make such variations and modifications or substitution of equivalents as would be apparent to a person of ordinary skill in this art.

I claim:

1. An electrical device comprising in combination: a main electrical power-source means for receiving main and full power from a main electrical power source; an electricity-carrying means for conducting electrical power to a main electrical utensil circuitry and having a composition, shape and structure characterized by and upper limit of a first predetermined maximum amperage-capacity at and above which potential fire hazard exists from overheating of circuitry and combustible matter associated therewith thereby heated to combustion temperature, and for safely operatively functioning and connected in series with said main electrical power-source means, for conducting main electric current in series to a main electrical utensil circuitry, with the electricity-carrying means positioned and located before any utensil main-power electrical circuit of a utensil in electrical series therewith, at electrical amperages at and below a second predetermined amperage at and below which said electrical utensil circuitry and associated combustible matter safely function devoid of fire hazard, said second predetermined amperage being below said first predetermined amperage; and said electricity-carrying means including a normally-closed heat-sensitive circuit-breaking means and a circuit-breaker circuitry therefor, for opening and thereby breaking electrical-circuit at a predetermined third electrical amperage within a range between said first and second predetermined amperages as a result of an responsive to detected heat for a period of time sufficient for increasingly-hot detected-temperature to have risen to a predetermined circuit-breaking temperature, said predetermined circuit-breaking temperature being below said combustion temperature of said combustible matter and the circuit-breaker circuitry, said heat-sensitive circuit-breaking means being for connecting in electrical series and for intermittently breaking electrical series and for intermittently breaking electrical circuitry of said circuit-breaker circuitry of electricity from said main electrical power-source means to said electric utensil circuit, said heat-sensitive circuit-breaking means being adapted and positioned to become heated by heat from said main electrical utensil circuitry to sufficiently elevated temperature from a sufficient period of time after amperage from the main power-source element is at-least as high as said third predetermind amperage, for said detected heat temperature to reach said predetermined circuit-breaking temperature said heat-sensitive circuit-breaking means including circuit-making means for automatically intermittently closing and thereby making electrical completed circuit whenever after said heat-detected temperature has dropped below said circuit-breaking temperature from a temperature at-least as high as the circuit-breaking temperature, and including an electronic power-delay means for delaying passage of electric current through said heat-sensitive circuit-breaking means and for a predetermined period of time after electrical-contact subsequent to a breaking-of electrical contact by the heat-sensitive circuit-breaking means, said period of time being sufficiently prolonged for the electricity-carrying means to cool-down sufficient as to avert an electrical fire, said electronic power-delay means being mounted in electrical series with said circuit-breaking means, positioned such that electrical flow through said heat-sensitive circuit breaker means becomes possible only after said predetermined period following breaking of electrical circuit by the heat-sensitive circuit breaking means.

2. The electrical device of claim 1, in which said main electric power-source means includes an electrical plug having male electric-plug prongs, and including said main electrical utensil circuitry, said main electrical utensil circuitry comprising electrical leads-means for conveying main-power electricity from said main electrical power-source means, said electrical lead means including a plurality of leads, said heat-sensitive circuit-breaking means and said circuit-breaking circuitry being in electrical series circuit with one of said plurality and with the electric-plug prongs thereof positioned such that activation of said circuit-breaking circuitry breaks circuitry between said electric-plug prongs and said one of said plurality.

3. The electrical device of claim 1, including said main electrical utensil circuitry comprising an electric wire, said electric wire including at-least one electrical circuitry utensil part and said electric wire including electric-wire circuitry, and said electricity-carrying means and said heat-sensitive circuit-breaking means being in electrical-series with at-least said one electrical circuitry utensil part of said electric-wire circuitry, positioned such that main electrical power passes through said electric wire circuitry.

4. The electrical device of claim 1, including said main electrical utensil circuitry, and said main power-source means comprising a utensil electrical power inlet-lead, and said main electrical utensil circuitry and said heat-sensitive circuit-breaking means being in operative electrical series with said electrical power inlet-lead, positioned such that activation of said circuit-breaking circuitry breaks circuitry of electricity through said main electrical power-source means and said utensil main-power electrical-circuitry.

5. The electrical device of claim 1, including said main electrical utensil circuitry, in which said main electrical utensil circuitry comprises an electric receptacle means and receptacle circuitry thereof having at-least one female electricity-outlet and at-least one outlet electrical contact thereof, and said main electrical power-source means including an electricity-input element and an outlet electrical contact, and said receptacle circuitry including said heat-sensitive circuit-breaking means being in electrical series with said one outlet electrical contact and with said electricity-input element, positioned such that activation of said circuit-breaking circuitry breaks circuitry between said said electricity-input element.

6. The electrical device of claim 1, including said main electrical utensil circuitry, in which said electrical utensil circuitry includes a light-bulb receptacle having at-least one female electricity-outlet contact, and said main electrical power-source means including an electricity input-element, the heat-sensitive circuit-breaking means being mounted in electrical series with said female electricity-outlet contact and with said electrical power inlet element, positioned such that activation of said heat-sensitive circuit-breaking means breaks electrical circuitry between said female electricity-outlet contact and said electricity input element.

7. The electrical device of claim 1, including said main electrical utensil circuitry, in which said main electrical utensil circuitry comprises an electric plug means for serving as an electrical inlet-plug, and plug means including multiple electrical female outlets and a plurality of electrical-outlets contacts thereof, and said plug means further including at-least one male plug electrical power-input prong, with the heat-sensitive circuit-breaking means being in electrical series between (a) at-least one of said one of said plurality of electrical-outlets contacts of each of said electrical outlets and (b) said at-least one male plug electrical power-input prong.

8. The electrical device of claim 1, including said main electrical utensil circuitry, in which said main electrical utensil circuitry comprises a light-dimmer means for varying power to at-least one light-circuitry, said light-dimmer means including at-least one light-dimming circuitry, and said main electical power-source means including an electricity input-element, and the heat-sensitive circuit-breaking means being mounted in electrical series with said at-least one light-dimming circuitry, and with said electrical power input-element, positioned such that activation of said heat-sensitive circuit-breaking means breaks electrical circuitry through said light-dimmer circuitry and said electricity input-element.

9. An electrical device of claim 1, including an alarm means for setting-off an alarm and for attracting attention of a person when said predetermined circuit-breaking temperature is exceeded, and for attracting attention of a person.

* * * * *